Patented May 31, 1927.

1,630,769

UNITED STATES PATENT OFFICE.

WINFIELD SCOTT, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF MAKING DISUBSTITUTED GUANIDINES.

No Drawing. Application filed February 15, 1923. Serial No. 619,318.

This invention relates to the production of disubstituted guanidines from the corresponding disubstituted thioureas, and comprises subjecting the disubstituted thioureas to a desulfurizing agent which either has been brought to a state of extremely fine subdivision, or which will be formed in this finely divided state during the course of the operation before it takes part in the desulfurizing reaction. More particularly, my new process in its most important aspect relates to the production of aromatic disubstituted guanidines such as diphenyl-, ditolyl-, and dixylyl-guanidines, and comprises subjecting the corresponding diaryl-thioureas to the action of certain basic metal salts, and especially the basic lead salts such, for example, as basic lead carbonate or white lead, and to the action of ammonia or ammonium hydroxide.

In the production of disubstituted guanidines from the corresponding thioureas, the choice of a desulfurizing agent and the temperature at which the reaction is carried out are important factors in obtaining substantial yields. With litharge, which has heretofore been used as a desulfurizing agent, rather more than the theoretical amount must be used, which makes the handling of the sulfide sludge less economical in addition to increasing the initial cost of the large amounts of lead oxide required to desulfurize the thiourea derivatives expediently. By using higher temperatures (above 65° C.) appreciable amounts of by-products are formed. Carbodiphenylimide, which is the product formed by removing the elements of hydrogen sulfide from thiocarbanilide, reacts with water to form carbanilide, and with diphenylguanidine to form tetraphenylbiguanide. These reactions affect the yield of diphenylguanidine appreciably if the amidation is carried out at temperatures above 65° C. Other disubstituted thioureas produce the corresponding by-products. Another advantage of carrying out the preparation of disubstituted guanidines at lower temperatures is that ammonia, being more soluble in alcohol or water at the lower temperature, is present in higher concentrations, thus reducing the formation of resinous by-products. This applies particularly where a large freeboard is maintained above the surface of the reaction mixture or where the reaction is not carried out in closed apparatus.

I have now discovered that certain lead compounds other than litharge are more effective for desulfurizing aryl substituted thioureas than is litharge. For example certain basic lead salts such as the basic carbonate or white lead gives better results with a 15% excess of the theoretical amount necessary, than 50-75% excess of litharge, in desulfurizing disubstituted thioureas for the preparation of disubstituted guanidines. Basic lead carbonate is more desirable not only from the standpoint of original costs, but because it involves the handling of smaller amounts of lead sludge which entails a smaller loss of yield and less difficulty in recoveries.

Other basic lead salts such as basic lead chloride, basic lead acetate, or basic lead nitrate may be used, as well as freshly precipitated lead hydroxide, which would be formed from ammonium hydroxide used and a soluble salt of lead in the reaction. Finely divided lead hydroxide precipitated in the reaction autoclave at the time the amidation is carried out is more effective as a desulfurizing agent than lead oxide. Alkali hydroxides may be used with the above mentioned basic lead compounds or hydroxide. When little or no alcohol is used a small amount of caustic (¼ mole or less for each mole of thiourea compound) aids in wetting the thiourea and acts as a solvent to bring the materials into more intimate contact. Furthermore, lower temperatures may be used which is desirable. By using a small amount of caustic the temperature of the reaction can be materially lowered.

Certain compounds of zinc and its related element cadmium may be used as desulfurizing agents in the preparation of disubstituted guanidines. Basic zinc carbonate is well suited for use in this type of reactions, and zinc oxide or hydroxide can be used in connection with caustic, which is equivalent to a solution of sodium zincate. Since caustic soda acts as a solvent for disubstituted thioureas and the above mentioned zinc compounds are soluble in ammonium hydroxide, the preparation of disubstituted guanidines proceeds quite smoothly at 60-72° C.

Just as certain cadmium compounds such as the basic carbonate, oxide, or hydroxide, or even the chloride or sulfate, and their complex ammonia derivatives, can be used as desulfurizing agents in accordance with my invention, so can the oxides and hydroxides of those elements related to lead be used. Stannous oxide, especially in the presence of caustic alkali, and the alkali-metal stannites are strong desulfurizing agents.

The preparation of disubstituted guanidines by means of the above mentioned inorganic compounds can be carried out in water or water and alcohol as reaction mediums. In case of large proportions of ethyl alcohol a small amount of other solvents may be mixed with the alcohol, among which might be mentioned benzene or toluene.

As an example of the use of basic lead carbonate in an aqueous medium the following procedure may be given. The reaction apparatus may consist essentially of a lead or brick-lined, gas tight autoclave equipped with suitable stirring and heating devices. If an iron or iron-lined autoclave is used the reaction mixture becomes contaminated with ferrous salts which require extra operations to remove. The proportions of materials used may be varied somewhat, but the following amounts will serve to illustrate the method:

| | Parts. |
|---|---|
| Thiocarbanilide | 100 |
| Basic lead carbonate | 128 |
| Ammonium hydroxide (28%) | 215 |
| Water | 20 |

I have found it desirable to add the thiocarbanilide first, then start the agitation. The water is next added in two portions and then the ammonium hydroxide in small portions until the thiocarbanilide is wetted after which the remainder of the ammonium hydroxide and the basic lead carbonate are added. After the above materials are mixed the autoclave is closed tightly and the temperature is raised to 65–70° C. and maintained for two or three hours. A pressure of about fifteen pounds per square inch of ammonia is developed when reaction temperature is reached. At the end of the reaction the pressure is released and the ammonia gas is absorbed in water or dilute ammonium hydroxide, then the residue in the autoclave is blown out, filtered and washed with a little water to remove ammonium hydroxide and carbonate. The black sludge containing the diphenylguanidine is then placed in a suitable tank and stirred up with cool water, and hydrochloric acid run in until the solution remains slightly acid. The diphenylguanidine hydrochloride solution is then filtered off and treated with a small amount of sulfuric acid or soluble sulfate to remove lead compounds and filtered again if necessary. The hydrochloride solution is treated with sodium hydroxide solution until faintly alkaline to Clayton yellow (Schultz No. 198), when the diphenylguanidine is filtered and washed free from sodium chloride, and dried.

If ethyl alcohol (for example, a 95% alcohol denatured with benzene) is used as a solvent in the preparation of disubstituted guanidines by the basic lead carbonate method, better yields are obtained than when water is used. The reaction proceeds well at lower temperatures and less ammonia is necessary. Consequently in the manufacture of diphenylguanidine it is desirable to use a mixture of alcohol either with water or with ammonium hydroxide as a dispersing medium, and solvent.

The use of a mixture of alcohol and ammonium hydroxide may be illustrated as follows: thiocarbanilide 100 parts, alcohol 300 parts by weight, basic lead carbonate 122 parts, ammonium hydroxide (28%) 90 parts.

The reaction autoclave is essentially the same as that indicated above except that in this case the apparatus is equipped with a steam inlet and a condenser for removing the alcohol, ammonia and ammonium carbonate. The temperature of this reaction may vary within rather wide limits (40–65° C.) though a temperature of 55–60° C. is usually employed as this promotes a quick reaction with a minimum amount of by-products. The heating is maintained from one and a half to two hours which insures complete reaction, after which steam is passed into the mixture and the alcohol, ammonia and ammonium carbonate is removed. The procedure in isolating the diphenylguanidine is the same as that outlined in the procedure above. Yields average 85–92%.

With zinc compounds (such as basic zinc carbonate) as desulfurizing agents, the procedure after the amidation is necessarily different from that when lead compounds are used as the zinc sulfide and the zinc desulfurizing agents are soluble in dilute mineral acids. If alcohol is used as the reaction medium the alcoholic solution is separated from the sludge by filtering hot, then the diphenylguanidine is obtained from the alcohol, by crystallization or by steam distilling off the alcohol and excess ammonia, extracting the residue with cold dilute hydrochloric acid and precipitating the diphenylguanidine with caustic. After washing and drying the diphenylguanidine is ready for use.

Diarylguanidines other than diphenylguanidine may be produced by substituting for the thiocarbanilide in the above examples the molecular equivalent of the appropriate diarylthiourea. Thus if it is desired to make ditolylguanidine or dixylylguanidine, the 100 parts of thiocarbanilide in the above examples may be replaced by 112 parts of ditolyl-thiourea or by 125 parts of di-para-xylyl-thiourea, respectively, the other conditions specified remaining substantially the same.

From what has been said regarding desulfurizing agents it can be seen that their action depends upon either a finely divided state such as is obtained with the lead and tin compounds in the absence of caustic, or the solubility of the desulfurizing agent in caustic alkali or ammonium hydroxide solution. In either case the desulfurizing agent is dispersed so that it presents a maximum "surface" for reaction. With basic lead carbonate, finely divided lead hydroxide is produced by the action of ammonium hydroxide. This lead hydroxide is a better desulfurizing agent than litharge, at least in part by reason of its finer state of sub-division. With basic zinc carbonate, its solubility in ammonium hydroxide gives it the most favorable condition for desulfurization, i. e. molecular dispersion.

Most of the compounds whose use as desulfurizing agents for thioureas constitutes an essential feature of the present invention, may be referred to generically as hydroxides or basic salts of cadmium, zinc, tin and lead, and of elements closely related thereto, including as equivalents, the mixtures or combinations of the oxygen derivatives (i. e. the oxides or hydroxides) of the above mentioned metals with an alkali-metal hydroxide. The new desulfurizing agents are characterized, and distinguished from litharge, by their tendency to become highly dipersed under the conditions favorable to the concurrent desulfurization and amidation reactions.

I claim:

1. The process of making disubstituted guanidines which comprises desulfurizing the corresponding disubstituted thiourea by the action thereon of a basic salt of a metal selected from a group consisting of lead, zinc, cadmium and tin in the presence of ammonium hydroxide.

2. The process of making a diarylguanidine which comprises subjecting the corresponding diarylthiourea to the action of ammonium hydroxide and of a desulfurizing agent comprising a basic salt of lead.

3. A process as set forth in claim 2 in which the temperature is maintained between 40 and 70° C., inclusive.

4. A process as set forth in claim 2 in which the temperature is maintained between 40 and 65° C.

5. The process of making a diaryl-guanidine which comprises subjecting the corresponding diaryl-thiourea to the action of an alcoholic solution of ammonium hydroxide and of a desulphurizing agent comprising a basic salt of lead.

6. The process of desulfurizing thioureas which comprises inducing a reaction between a thiourea and a finely subdivided basic salt of lead.

7. The process of desulfurizing disubstituted thioureas which comprises treating the thiourea with basic lead carbonate in an alkaline-reacting medium.

8. The process of making di-ortho-tolyl-guanidine which comprises desulfurizing di-o-tolyl-thiourea in the presence of an alcoholic solution of ammonium hydroxide by the action of a basic salt of lead.

9. A process as set forth in claim 8 in which the reaction mass is maintained at a temperature between 40 and 65° C.

10. A process as set forth in claim 8 in which the desulfurizing agent is basic lead carbonate.

11. The process of making a diarylguanidine which comprises heating a mixture containing the corresponding diarylthiourea, ammonium hydroxide, water, and a basic salt of a metal selected from a group consisting of lead, zinc, cadmium and tin which tends to become highly dispersed in the presence of an alkali-metal hydroxide, the temperature being kept between 60 and 70° C., inclusive, until the reaction is substantially completed.

12. The process of making a diarylguanidine which comprises heating a mixture containing the corresponding diarylthiourea, ammonium hydroxide, an alkali-metal hydroxide, water, and a basic salt of a metal selected from a group consisting of lead, zinc, cadmium and tin which tends to become highly dispersed in the presence of said alkali-metal hydroxide, the temperature being kept between 40 and 72° C. until the reaction is substantially completed.

13. A process as set forth in claim 12 in which the temperature is maintained between 40 and 65° C.

14. The process of making a diarylguanidine which comprises heating a mixture containing the corresponding diarylthiourea, ammonium hydroxide, ethyl alcohol, water, and a basic salt of a metal selected from a group consisting of lead, zinc, cadmium and tin which tends to become highly dispersed in an alcoholic solution of ammonium hydroxide, the temperature of the mixture being maintained between 40 and 65° C. until the reaction is substantially completed.

15. The process as set forth in claim 11 in which the desulfurizing agent is a basic salt of lead.

16. The process as set forth in claim 11 in which the desulfurizing agent is basic lead carbonate.

17. A process as set forth in claim 14 in which the desulfurizing agent is basic lead carbonate, and in which the temperature is maintained between about 55 and 60° C.

18. A process as set forth in claim 12 in which the diaryl-thiourea is di-o-tolyl-thiourea.

19. A process as set forth in claim 14 in which the diaryl-thiourea is di-o-tolyl-thiourea.

20. The process of making di-o-tolyl-guanidine which comprises heating, for from 1½ to 2 hours at a temperature of from about 55 to 60° C., a mixture containing 112 parts of di-o-tolyl-thiourea, about 300 parts of aqueous alcohol containing about 95% of ethyl alcohol, about 122 parts of basic lead carbonate, and about 90 parts of water containing 28% of ammonium hydroxide, and then passing steam through the mass to remove alcohol, ammonia, and ammonium carbonate.

In testimony whereof I affix my signature.

WINFIELD SCOTT.